Dec. 15, 1959 V. E. EMANUELSON 2,917,059

CAR TOP TENT

Filed May 23, 1958 3 Sheets-Sheet 1

Verner E. Emanuelson
INVENTOR.

BY Clarence A. O'Brien
and Harvey B. Jacobson
Attorneys

Dec. 15, 1959 V. E. EMANUELSON 2,917,059

CAR TOP TENT

Filed May 23, 1958 3 Sheets-Sheet 2

Verner E. Emanuelson
INVENTOR.

BY Clarence A. O'Brien and Harvey B. Jacobson
Attorneys

Dec. 15, 1959 V. E. EMANUELSON 2,917,059

CAR TOP TENT

Filed May 23, 1958 3 Sheets-Sheet 3

Verner E. Emanuelson
INVENTOR.

BY Clarence A. O'Brien
and Harvey B. Jacobson
Attorneys

United States Patent Office 2,917,059
Patented Dec. 15, 1959

2,917,059

CAR TOP TENT

Verner E. Emanuelson, Great Falls, Mont.

Application May 23, 1958, Serial No. 737,350

3 Claims. (Cl. 135—1)

This invention relates in general to campers' equipment and pertains more particularly to a tent assembly adapted to be mounted upon the top of an automobile or the like.

At the present time, much interest is displayed in camping during the summer vacations particularly. However, many people are not willing to experience the difficulty of pitching a tent upon the ground and for this reason automobile trailers have come into wide usage. However, automobile trailers are at best cumbersome and expensive and do not really solve the problem insofar as casual campers are concerned. It is therefore of primary concern in connection with this invention to provide a novel type of tent construction adapted to be carried upon an automobile over the top thereof and which tent is movable between a collapsed position and an erected position both of which are assumed while the assembly is carried atop the car.

Another object of this invention is to provide improvements in car tents wherein the assemblage, when stored, forms a neat and compact assembly offering as little wind resistance as posssible to the normal travel of the automobile and yet when erected will form a roomy and ample tent construction.

Still another object of this invention is to provide a device of the character described incorporating a base portion adapted to be rigidly affixed to an automobile above the passenger compartment thereof and which has hingedly secured at the opposite ends thereof a pair of end members movable between positions in which they form extensions of the base and positions in which they overlie the base in a compact manner, the base carrying a series of rigid frame elements articulated thereto and over which a tent covering material is arranged.

Another object of this invention is to provide a device in accordance with the preceding object wherein the base and end members of generally U-shaped configuration, having a floor portion and upstanding side walls and being so hingedly intereconnected as to form, when folded, a compartment containing the tent material and the articulate frames.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
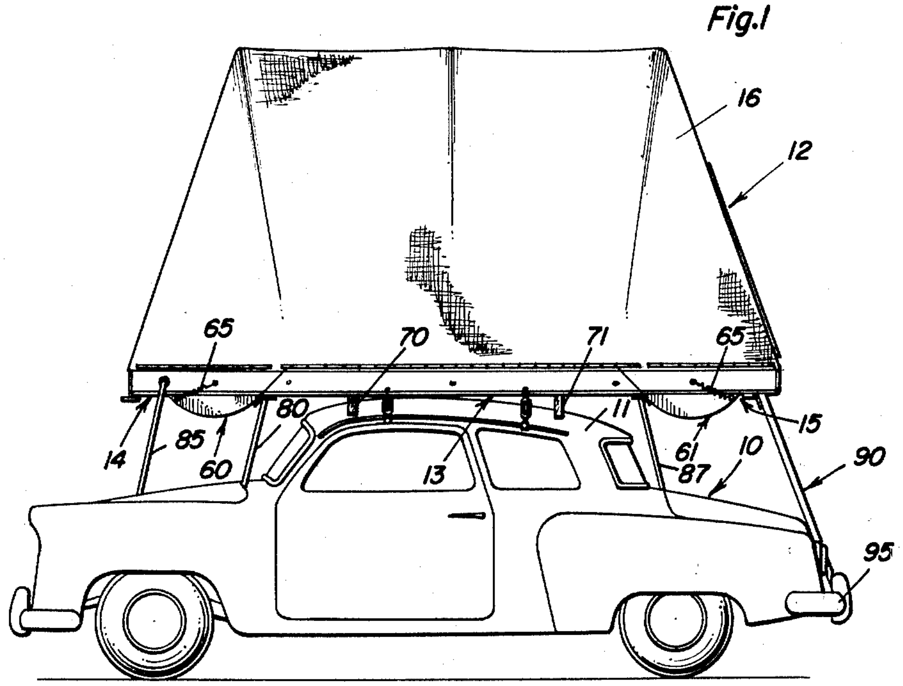
Figure 1 is a side elevational view of an automobile having the instant invention attached thereto and illustrating the tent in the erected position.

Referring at this time more particularly to Figure 1, the reference numeral 10 indicates in general an automotive vehicle of conventional construction including the roof portion 11 upon which the invention, illustrated generally by the reference character 12 is adapted to be supported. The invention itself includes a base portion indicated generally by the reference character 13 and having, in conjunction therewith, a pair of end extensions or members indicated generally by the reference characters 14 and 15. The base portion 13 as well as the end portions 14 and 15 have secured thereto a suitable covering or flexible material 16 forming a tent, as is clearly evident in Figure 1.

Figure 4:
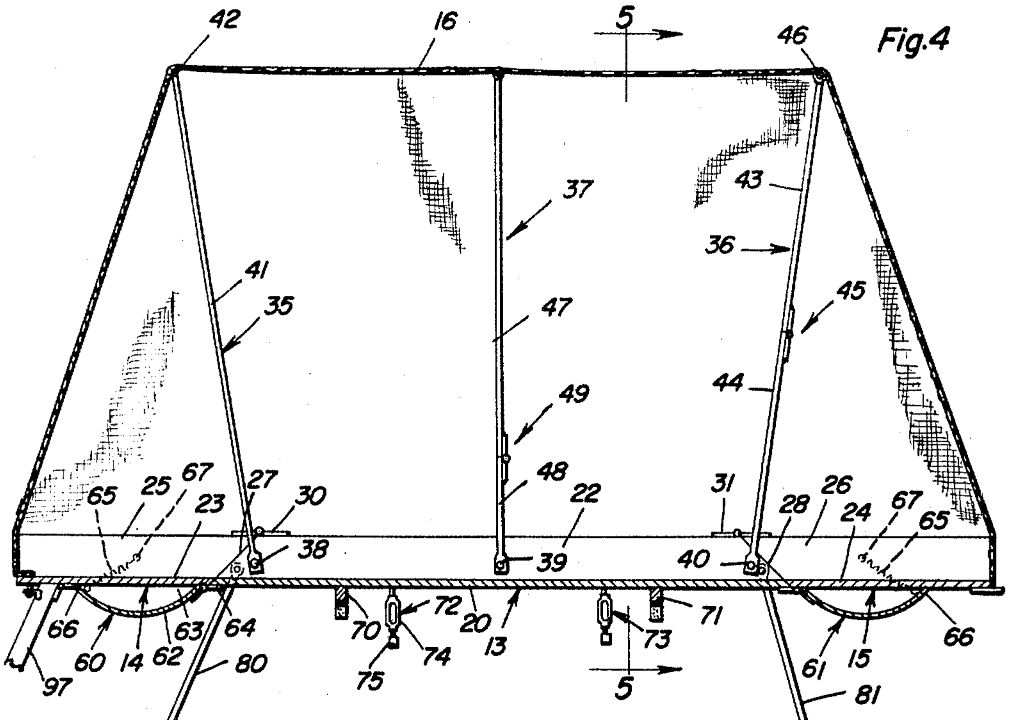
Figure 4 is an enlarged vertical section taken substantially along the plane of section line 4—4 in Figure 2 and illustrating some of the details of the internal construction of the tent assembly.
Figure 5:
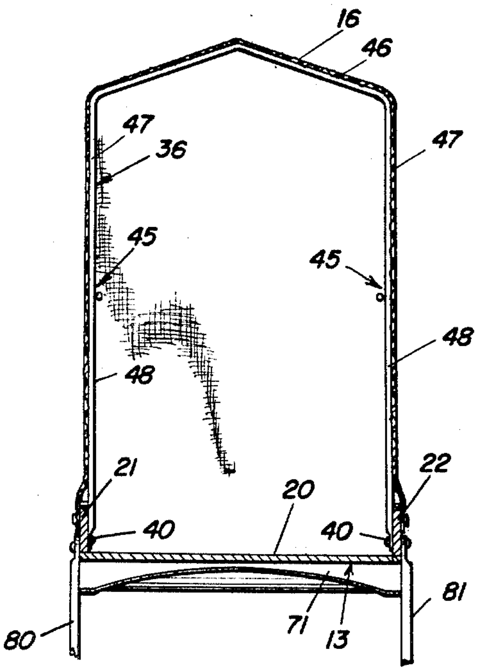
Figure 5 is a vertical transverse section taken substantially along the plane of section line 5—5 of Figure 4 illustrating details of the frame constructions as well as the configuration of the base as well as the end portions.

As can be best seen in Figure 5, the base portion 13 includes a floor 20 and a pair of opposite side walls 21 and 22 rising therefrom along the opposite longitudinal side edges thereof. Likewise, see particularly Figure 4, the end members 14 and 15 also include floors 23 and 24 respectively and opposite side walls 25 and 26. The ends of the base side walls 21 and 22 are diagonally cut so as to taper downwardly and outwardly as indicated by the reference characters 27 and 28 and the corresponding ends of the side walls 25 and 26 of the end members 14 and 15 are correspondingly angulated as is illustrated best in Figure 4 and the side walls 25 and 26 are connected to the corresponding base side walls 21 and 22 by means of hinge elements 30 and 31 so that the points of pivotal connections between these various side walls are substantially at the intersection of the upper edges thereof. This permits the end extensions 14 and 15 to be folded over upon the base portion 13 in the manner best illustrated in Figure 6 whereby there is formed, between the floor portions 20, 23 and 24, a compartment housing the frame assemblies, hereinafter described, as well as the tent material 16.

As is best shown in Figures 4 and 5, for supporting the tent in the upright position, there are provided first and second end frame members indicated generally by the reference characters 35 and 36 respectively and an intermediate frame member indicated generally by the reference character 37. Each of the frame members is of generally inverted U-shaped configuration having the lower ends of its legs disposed in close adjacency to the opposed inner faces of the side walls 21 and 22 of the base member 13 and pivotally attached thereto as by fasteners 38, 39 and 40 as is indicated in Figure 4.

The frame member 35 includes the integral leg portions 41 and a bight portion 42. The second end frame 36 includes the articulated leg portions 43 and 44 joined by the combined hinge and locking means indicated generally by the reference character 45 and includes the bight portion 46. The intermediate frame member 37 includes leg portions in two sections as indicated by the reference characters 47 and 48 joined by the combined hinge and locking means 49. The purpose of this construction will be readily appreciated by a study of Figure 6 wherein it will be seen that the length of the frame member 35 is such as to be wholly confined or contained within the compartment provided for by the collapsed elements of the assembly whereas the intermediate frame element 37, being of the same length as the first end frame element 35, must of necessity be folded in an intermediate portion by the assembly 49 to permit the frame element to be confined within the compartment. Likewise, the frame assembly 36 must of necessity be collapsed or folded in the manner indicated so as to be confined within the compartment.

For this reason, the connection 49 in the intermediate frame element 37 is established adjacent the lower terminal ends of the legs thereof whereas the hinge connection 45 in the second end frame element 36 is established substantially midway between the opposite ends thereof, substantially as is shown in Figure 4. In this manner, all of the frame elements can be conveniently collapsed and stored within the compartment provided for between the floor portions 23, 24 and 20.

The tent material 16 is itself secured peripherally to the base 13 and the end members 14 and 15 by any suitable means and it is also provided with internal loops or suitable equivalents extending around the bight portions of the frame assemblies 35, 36 and 37. In this manner, as the end assemblies 14 and 15 are unfolded to the position illustrated in Figure 4, the tent material 16 constrains the frame assemblies 35, 36 and 37 to assume their upright positions as is illustrated in this figure and as opposed to the collapsed positions thereof as is indicated and illustrated in Figure 6 of the drawings.

Figure 7:
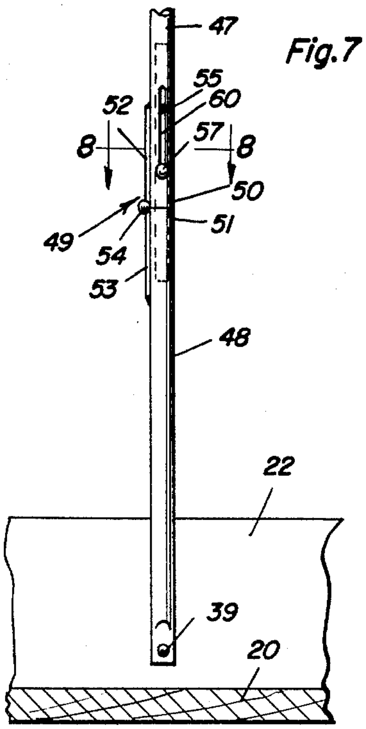
Figure 7 is an enlarged partial section illustrating the details of the intermediate frame element.
Figure 8:
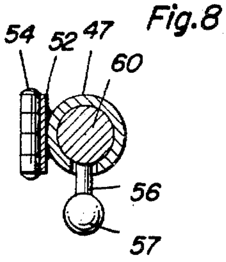
Figure 8 is an enlarged horizontal section taken substantially along the plane of section line 8—8 in Figure 7 illustrating the locking means associated with certain of the frame elements.

With reference now more particularly to Figures 7 and 8, the details of one of the combined locking and hinge assemblies is shown, in this particular instance the hinge assembly being that indicated in Figure 4 by the reference character 49. In Figure 7, it will be clear that mating ends 50 and 51 of the leg portions 47 and 48 respectively, when in the upright position of the frame, are disposed in coaxial relationship. Each has a hinge plate 52 and 53 rigidly affixed thereto interconnected by the pintle or pin 54 whereby the articulation between these leg elements 47 and 48 is permitted. The upper leg element 47 is provided with an elongate slot 55 through which the rod 56 projects, terminating in a knob 57 and each of the leg portions 47 and 48 at least adjacent the abutting end portions is tubular so as to receive therein the locking shaft or bar 60 which, in the position of Figure 7, extends into both the leg portions 47 and 48. When it is desired to fold the frame member 37 or 36, the corresponding bar 56 is manipulated through the knob 57 to lift the bar 60 so as to unseat from the lower frame member 48, thus permitting the hinge pintle 54 to permit the articulation between the two sections 47 and 48.

Figure 6:
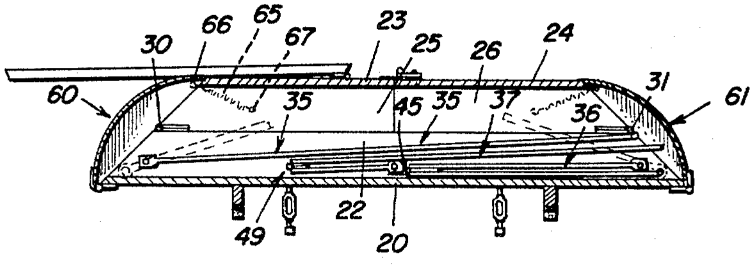
Figure 6 is a longitudinal section taken through the assembly when in the stored position and illustrating the relative position of the component parts of the assembly within such positions.

To effect end covers for the compartment when the assembly is in the collapsed or stored position, there are provided the end cover members indicated generally by the reference characters 60 and 61, see particular Figures 4 and 6. Each of said end covers incorporates a convex bottom 62 and opposite side walls 63 with the bottom 62 being hinged as at 64 to the end portions of the base 13 substantially as illustrated. When the parts are in the stored position as illustrated in Figure 6, the end covers 60 and 61 engage along the normally abutting end surfaces of the side walls as is illustrated in this figure and form covers or closures for the ends of the compartment afforded between the floor portions 23, 24 and 20. For this purpose, spring elements 65 are connected between the free end portions 66 of the end covers and suitable pins or anchoring elements 67 on the outer sides of the side walls of the end members 14 and 15.

In order to mount the assembly on the automobile roof, a pair of transverse support stanchions 70 and 71 are rigidly affixed to the undersurface of the base portion 13, see particularly Figures 1, 4 and 5. The undersurfaces of these members are so configurated as to conform to the shape of the automobile roof and at the opposite sides of the base portion are provided the hook elements indicated generally by the reference characters 72 and 73 which include the turnbuckle or portions 74 and the hook portions 75, the latter of which are adapted to engage over the rain gutters 76 of the automobile as illustrated most clearly in Figure 9. The turnbuckle portions 74 may be manipulated to tighten the assembly to the roof.

Figure 2:
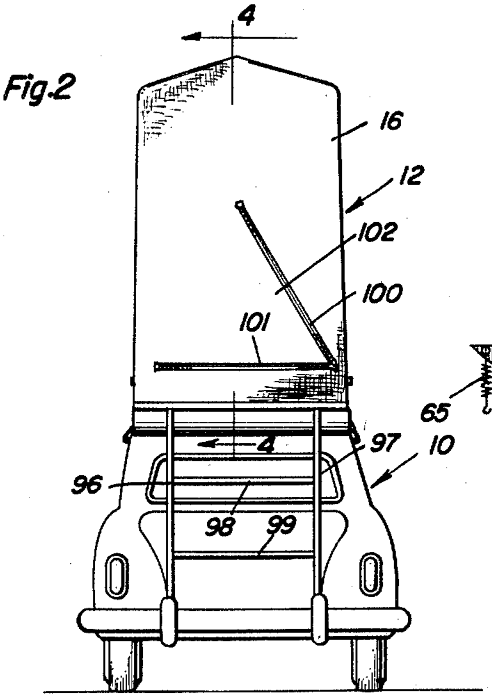
Figure 2 is an end view of the assembly illustrated in Figure 1.
Figure 10:
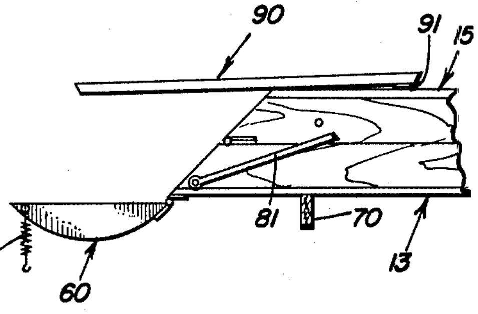
Figure 10 is a partial elevational view illustrating the manner in which the end covers for the assembly are associated therewith.
Figure 3:
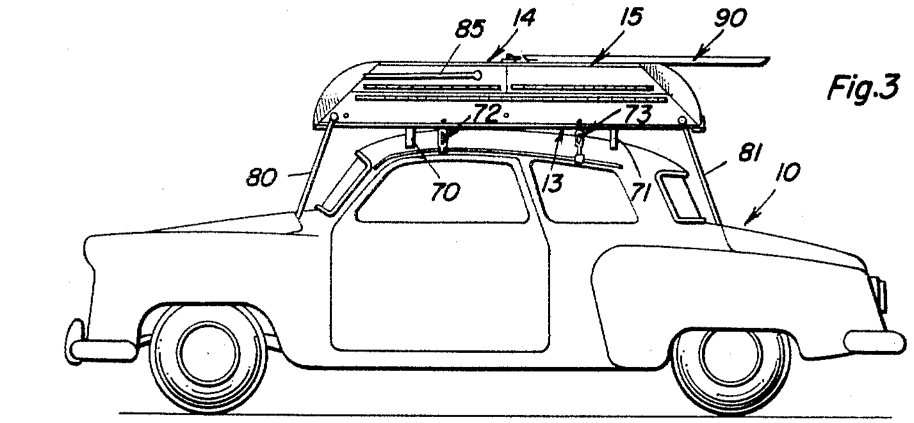
Figure 3 is a side elevational view similar to Figure 1 but illustrating the tent assembly in the collapsed position or stored upon the top of the automobile.

To provide additional bracing means when the tent assembly is in use, the bracing legs 80 and 81 are provided on opposite sides of the base at each end thereof as is illustrated most clearly in Figures 1 and 4 and which brace members are adapted to be hinged downwardly in the manner illustrated in Figure 1, from the position illustrated in Figure 10, to engage upon the body of the automobile and in part support the tent structure. Additionally, further brace legs 85 are carried by the end member 14 for engaging upon the hood of the automobile substantially as is shown in Figure 1. At the rear of the tent structure, there is a ladder assembly indicated generally by the reference character 90 which is hingedly secured as at 91 to the undersurface of the rear end member 15 so as to be swung downwardly when the parts are in the extended position to engage upon the vehicle rear bumper 95, this ladder being provided with the vertical side rails 96 and 97, see particularly Figure 2, and the transverse rungs 98 and 99 permitting easy access into the rear of the tent assembly. The rear panel of the tent is provided with an angulated line of severance normally closed by zippers 100 and 101 and forming a flap 102 therebetween to permit access into the interior of the tent assembly.

Figure 9:
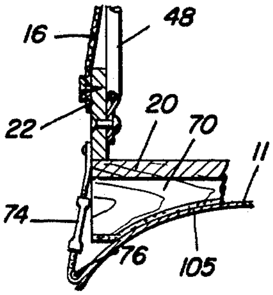
Figure 9 is an enlarged partial section illustrating the manner in which the base may be secured to the vehicle top.

Naturally, the undersurfaces of the stanchions 70 and 71 are provided with any type of protective material such as that indicated by the reference character 105 in Figure 9 to protect the finish of the automobile roof 11.

The front and center bows will be fastened to the roof of the tent permanently. However, the rear bow is preferably fastened in such a way that it may be released from the tent and laid on the floor of the device so that, if desired, the rear portion 23 may be left extended for hauling cargo. In this case, the front portion could also be left extended for hauling long cargo such as pipes, lumber etc.

By slightly decreasing the height of this device it could at the time of manufacture be built into the roof of a camper's model of a car or station wagon without appreciably increasing the total height of the vehicle.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. A collapsible tent assembly comprising an elongated base having ends, upright sides and a floor, a pair of extensions for the ends of the base each having sides and a floor, hinges pivotally connecting the sides of the extensions to the sides of the base for folding and unfolding of said extensions on said base, said extensions when unfolded having the floors thereof coplanar with the floor of the base and when folded overlying the base with the sides of the extensions seating on top of the sides of the base to form with said base a compartment open at the ends of the base, a plurality of generally U-shaped frames having ends pivoted to the sides of the base for folding of said members into said base and for unfolding upwardly of said base, and a flexible covering secured to said members and to said extensions for forming into a tent in response to unfolding of said extensions and members and for collapsing into said base in response to folding of said members and said extensions.

2. The combination of claim 1, and closures for the open ends of the compartment hinged to the bottom of the base for swinging into and from closing position.

3. The combination of claim 1, the sides of the base abutting the sides of the extensions when the extensions are unfolded.

References Cited in the file of this patent

UNITED STATES PATENTS

| | | |
|---|---|---|
| 1,241,342 | Chapman | Sept. 25, 1917 |
| 1,407,259 | Curtis | Feb. 21, 1922 |
| 1,424,222 | Tuttle | Aug. 1, 1922 |
| 2,222,636 | Strauss | Nov. 26, 1940 |
| 2,863,265 | Wayne | July 13, 1954 |